United States Patent
Saur

(10) Patent No.: US 8,336,640 B2
(45) Date of Patent: Dec. 25, 2012

(54) HAND-HELD POWER TOOL

(75) Inventor: Dietmar Saur, Gomaringen (DE)

(73) Assignee: Robert Bosch GmbH, Stuttgart (DE)

( * ) Notice: Subject to any disclaimer, the term of this patent is extended or adjusted under 35 U.S.C. 154(b) by 360 days.

(21) Appl. No.: 12/724,002

(22) Filed: Mar. 15, 2010

(65) Prior Publication Data
US 2010/0236805 A1 Sep. 23, 2010

(30) Foreign Application Priority Data
Mar. 19, 2009 (DE) .................. 10 2009 001 657

(51) Int. Cl.
B25F 5/00 (2006.01)
(52) U.S. Cl. .................. 173/216; 173/213; 173/217
(58) Field of Classification Search .................. 173/216, 173/213, 217
See application file for complete search history.

(56) References Cited

U.S. PATENT DOCUMENTS

| | | | | |
|---|---|---|---|---|
| 4,242,839 A * | 1/1981 | Armbruster et al. | ........... | 451/357 |
| 4,671,364 A * | 6/1987 | Fink et al. | ........... | 173/178 |
| 4,947,942 A * | 8/1990 | Lightle et al. | ........... | 173/216 |
| 5,361,853 A * | 11/1994 | Takamura et al. | ........... | 173/217 |
| 5,385,512 A * | 1/1995 | Moolenaar et al. | ........... | 475/153 |
| 5,706,902 A * | 1/1998 | Eisenhardt | ........... | 173/93.5 |
| 5,947,210 A * | 9/1999 | Sasaki et al. | ........... | 173/178 |
| 6,093,128 A * | 7/2000 | Seith | ........... | 475/258 |
| 6,213,224 B1 * | 4/2001 | Furuta et al. | ........... | 173/217 |
| 6,394,191 B1 * | 5/2002 | Nakane | ........... | 173/217 |
| 6,962,212 B2 * | 11/2005 | Riedl | ........... | 173/216 |
| 6,966,391 B2 * | 11/2005 | Tang | ........... | 173/216 |
| 7,455,121 B2 * | 11/2008 | Saito et al. | ........... | 173/93.5 |
| 2003/0066667 A1 * | 4/2003 | Zhang | ........... | 173/217 |
| 2003/0121683 A1 * | 7/2003 | Lebisch et al. | ........... | 173/217 |
| 2004/0163831 A1 * | 8/2004 | Ortt et al. | ........... | 173/217 |
| 2004/0163832 A1 * | 8/2004 | Riedl | ........... | 173/217 |
| 2006/0237205 A1 * | 10/2006 | Sia et al. | ........... | 173/48 |

* cited by examiner

Primary Examiner — Brian D Nash
(74) Attorney, Agent, or Firm — Kenyon & Kenyon LLP

(57) ABSTRACT

The invention is based on a hand-held power tool, in particular a cordless screwdriver, having a drivable output shaft, a supporting element, and a roller bearing unit that is provided to transmit a supporting force of the output shaft to the supporting element. According to the invention, the output shaft and/or the supporting element constitutes at least one roller element running surface of the roller bearing unit.

20 Claims, 4 Drawing Sheets

HAND-HELD POWER TOOL

CROSS-REFERENCE TO RELATED APPLICATION

This application is based on German Patent Application 10 2009 001 657.1 filed Mar. 19, 2009.

BACKGROUND OF THE INVENTION

1. Field of the Invention

The invention is based on a hand-held power tool, in particular a cordless screwdriver.

2. Description of the Prior Art

A hand-held power tool, in particular a cordless screwdriver, has already been proposed, which has a drivable output shaft, a supporting element, and a roller bearing unit that is provided to transmit a supporting force of the output shaft to the supporting element.

ADVANTAGES AND SUMMARY OF THE INVENTION

The invention is based on a hand-held power tool, in particular a cordless screwdriver, which has a drivable output shaft, a supporting element, and a roller bearing unit that is provided to transmit a supporting force of the output shaft to the supporting element.

As proposed by the invention, the output shaft and/or the supporting element constitutes at least one roller element running surface of the roller bearing unit. In this context, an "output shaft" should be understood in particular to mean a shaft such as a working spindle that transmits a torque from a motor, in particular an electric motor, indirectly or more precisely stated, via a transmission, to a tool such as a screwdriver bit. A "supporting element" should be understood in particular to mean an element that is provided to absorb bearing forces of the output shaft and/or to transmit them to a housing of the hand-held power tool and/or that in particular represents a component of the housing and/or of a transmission housing of the hand-held power tool. In addition, a "roller bearing unit" should be understood in particular to mean a unit that has at least one roller element in the form of a barrel, a needle, and/or a ball and/or that is situated spatially between the output shaft and the supporting element and/or absorbs the bearing forces of the output shaft and transmits them to the supporting element. In this context, a "roller element running surface" should be understood in particular to be a surface against which the roller elements roll and/or to be part of a roller bearing. The roller element running surface particularly extends around the output shaft in the circumference direction. The expression "the output shaft and/or the supporting element constitutes at least one roller element running surface of the roller bearing unit" should be understood in particular to mean that the roller element running surface is integral with the output shaft and/or the supporting element; "integral with" should be understood in particular here to mean of one piece with and/or composed of a single casting and/or composed of a single component. In addition, "provided" should be understood to mean especially equipped and/or designed. The embodiment according to the invention advantageously makes it possible to implement a reduced overall radial length of the hand-held power tool in the region of the output shaft. Furthermore, the integral embodiment makes it possible to achieve savings in terms of parts, space, and costs in a structurally simple way.

According to another proposal, the output shaft constitutes an inner roller element running surface of the roller bearing unit. This should be understood in particular to mean the embodiment of the roller element running surface as integral with the output spindle; the inner roller element running surface is preferably situated on an outer surface of the output shaft oriented toward the supporting surface and extends along its circumference. The implementation of the inner roller element running surface makes it possible in a particularly effective manner to transmit powerful forces from a tool, which is operatively connected to the output shaft, to a housing of the hand-held power tool. This also achieves a good quality of concentricity for the output shaft.

The roller element running surface advantageously has at least one supporting surface in the axial direction of the output shaft. An "axial direction" is defined here in particular as a direction extending in a main span direction of the output shaft. A "supporting surface" should be understood in particular to mean a surface that confines and/or limits a movement freedom of the roller element rolling against the roller element running surface at least in the axial direction. The supporting surface can be advantageously embodied to provide a good axial guidance of the roller elements along the roller element running surface.

It is also advantageous if, in the axial direction of the output shaft, the roller element running surface has at least one second supporting surface that allows for further improvement of the axial guidance. The two supporting surfaces are preferably situated on two axially opposite sides of the roller element running surface.

In another proposed embodiment of the invention, the roller element running surface is embodied in the form of a segment of a circle. The expression "in the form of a segment of a circle" should be understood in particular here to mean a form that is adapted to at least one outer contour of a roller element of the roller bearing unit and/or that is constituted by an external radius or arc of a segment of a circle; a "segment of a circle" is a part of a circular area that is divided into two unequal segments by a chord. Due to its embodiment in the form of a segment of a circle, the roller element running surface is able to guide the roller element with a particularly small amount of play.

In another proposed embodiment, the roller bearing unit constitutes a ball bearing, making it possible to use a roller bearing unit with particularly material-friendly properties.

It can also be advantageous if the roller bearing unit is situated at an end oriented toward an output end of the output shaft. An "output end of the output shaft" should be understood in particular to mean an end that is oriented toward a tool holder of the output shaft. This arrangement makes it possible to support not only radial but also axial bearing forces, permitting a bearing force of the output shaft to be transmitted to a housing of the hand-held power tool spatially close to a tool holder in a manner that is gentle to the output shaft. A reliable and stable support of the output shaft can be advantageously achieved if the hand-held power tool has at least one additional bearing unit that is provided to support the output shaft.

According to another proposal, the additional bearing unit is situated at an end oriented away from an output end of the output shaft, thus making it possible to achieve a balanced support of the output shaft.

A preferred modification proposes that the at least one additional bearing unit is constituted by a slide bearing or an additional roller bearing unit. An embodiment in the form of a slide bearing makes it possible to implement the additional bearing unit in a way that is inexpensive and also saves on space and parts. By means of an additional roller bearing unit, it is also possible in a structurally simple fashion to support powerful bearing forces, thus also making it possible to achieve an advantageously material-friendly distribution of force.

According to another proposal, the roller bearing unit is partially integral with the additional roller bearing unit. In this context, "integral with" should be understood in particular to mean that the two roller bearing units can only be separated from each other with the loss of function of at least one of the roller bearing units and/or that the roller bearing unit has at least one component that is also a component of the additional roller bearing unit. The integral embodiment makes it possible to embody a support in a way that provides particular savings in terms of parts and costs.

According to another proposed embodiment of the invention, the roller element running surface is let into the output shaft and/or the supporting element by means of a material-removing method. In this context a "material-removing method" should be understood in particular to mean a cutting process and/or a grinding process and/or particularly advantageously, a turning process. In general, it would also be conceivable to use another method that appears suitable for the purpose to the person skilled in the art. By means of the material-removing method, the roller element running surface can be inexpensively let into the output shaft by means of a simple manufacturing process.

According to another proposal, the hand-held power tool has a stop collar for a tool holder and the axial width of this stop collar is greater than 80% of an axial width of the roller bearing unit. In general, an axial width of greater than 100% would also be conceivable. A "stop collar" should be understood in particular here to mean a shape, in particular of the output shaft, which extends in a radial direction toward the supporting element and/or constitutes an axial stop for the tool holder in an assembly procedure, e.g. a screw-mounting, of a tool holder such as a drill chuck. Basically, it would also be conceivable to embody the stop collar as a part that is separate from the output shaft. The wide stop collar makes it possible to implement or ensure a good support of prestressing forces during assembly and when holding the tool holder.

According to another proposal, an outer diameter of the output shaft in a region of the roller element running surface is at least 55% of an outer diameter of the output shaft in a region of a stop collar of a tool holder. In general, an outer diameter of greater than 75% would also be conceivable. This is possible because a space that is occupied by an inner ring of the roller bearing in roller bearing units that are currently the standard can be filled by the working shaft in the embodiment according to the invention. Embodying the output shaft with a large outer diameter permits a particularly stable embodiment of the output shaft. In general, though, it would also be possible to maintain the dimensions of the output shaft in accordance with the currently standard embodiment, which would conversely permit an advantageous reduction of a radial distance of the supporting element or the housing of the hand-held power tool from the output shaft, which immediately yields a smaller and lighter-weight hand-held power tool.

The output shaft is advantageously embodied as a hollow shaft, at least in a subregion in which the roller bearing unit is situated. A "hollow shaft" should be understood in particular here to mean a shaft with a central opening extending in the axial direction. In this case, the subregion preferably extends from the output end of the output shaft toward the region in which the roller element running surface is situated and extends beyond this in the axial direction toward the additional healing unit. Embodying the subregion as a hollow shaft permits the output shaft to be embodied in a structurally simple fashion in the form of a socket for a tool holder such as a drill chuck and/or directly as a tool holder. In connection with the possibility of embodying the output shaft with a broad outer diameter, this yields a particularly rugged socket or tool holder. Basically, however, it would also be conceivable to embody the output shaft in the form of a hollow shaft over its entire axial length.

In another proposed embodiment of the invention, the output shaft is embodied with a constant outer diameter in a subregion that extends from an end of the output shaft situated at an output end to the roller element running surface of the roller bearing unit. An "end of the output shaft situated at an output end" should be understood in particular to mean an end at which a tool can be fastened directly to the output shaft. A "constant outer diameter" should be understood in particular to mean an outer diameter that is embodied as continuous. By means of the embodiment according to the invention, the output shaft can be produced in a manner that saves material and costs and is also structurally simple.

It is also advantageous if the hand-held power tool has a planetary gear that makes it possible to transmit a torque from a motor to the output shaft in a good and variable fashion.

BRIEF DESCRIPTION OF THE DRAWINGS

The invention will be better understood and further objects and advantages thereof will become more apparent from the ensuing detailed description of preferred embodiments taken in conjunction with the drawings, in which.

DESCRIPTION OF THE PREFERRED EMBODIMENTS

Figure 1:
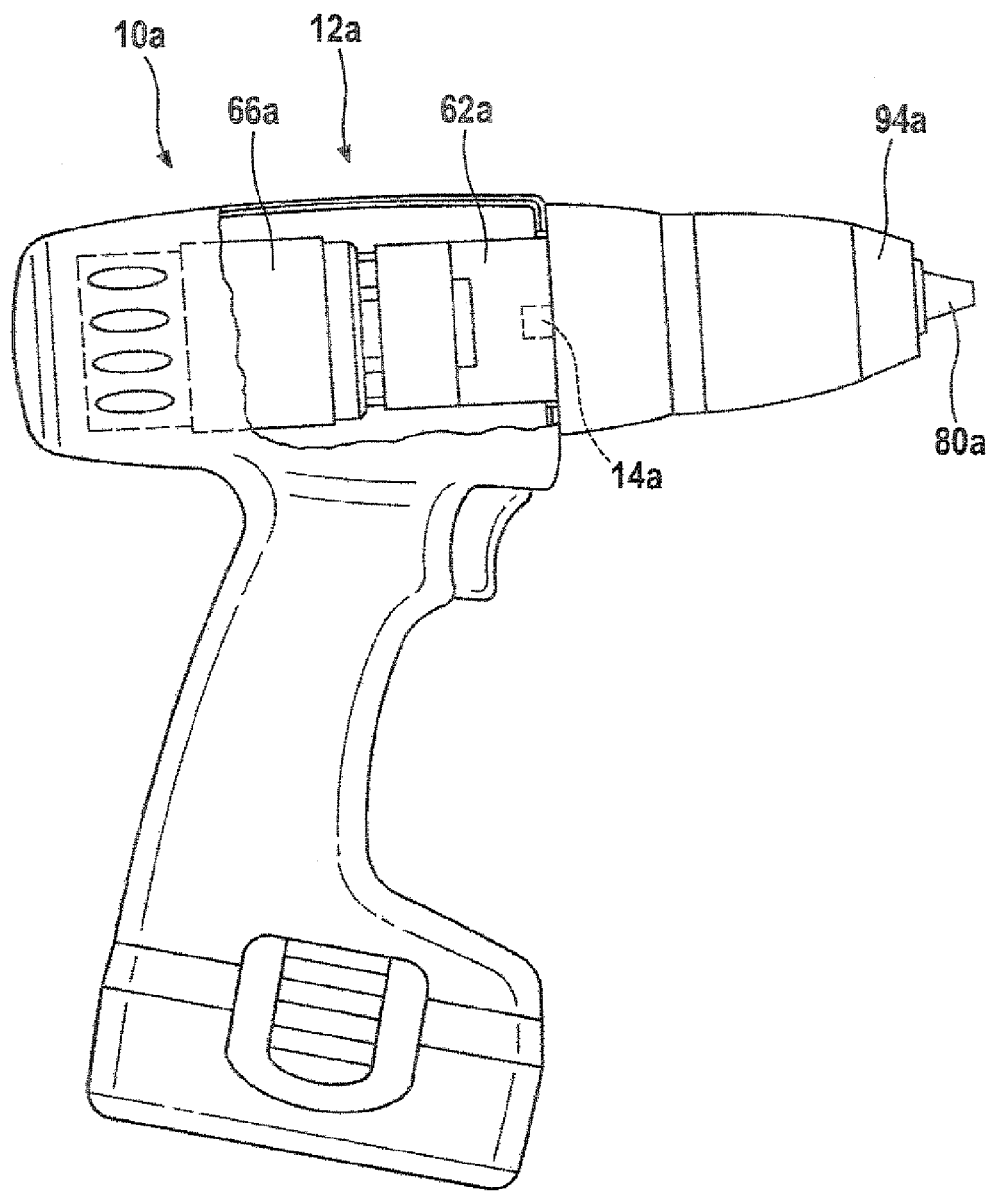
FIG. 1 shows a hand-held power tool according to the invention, embodied in the form of a cordless screwdriver.
Figure 2:
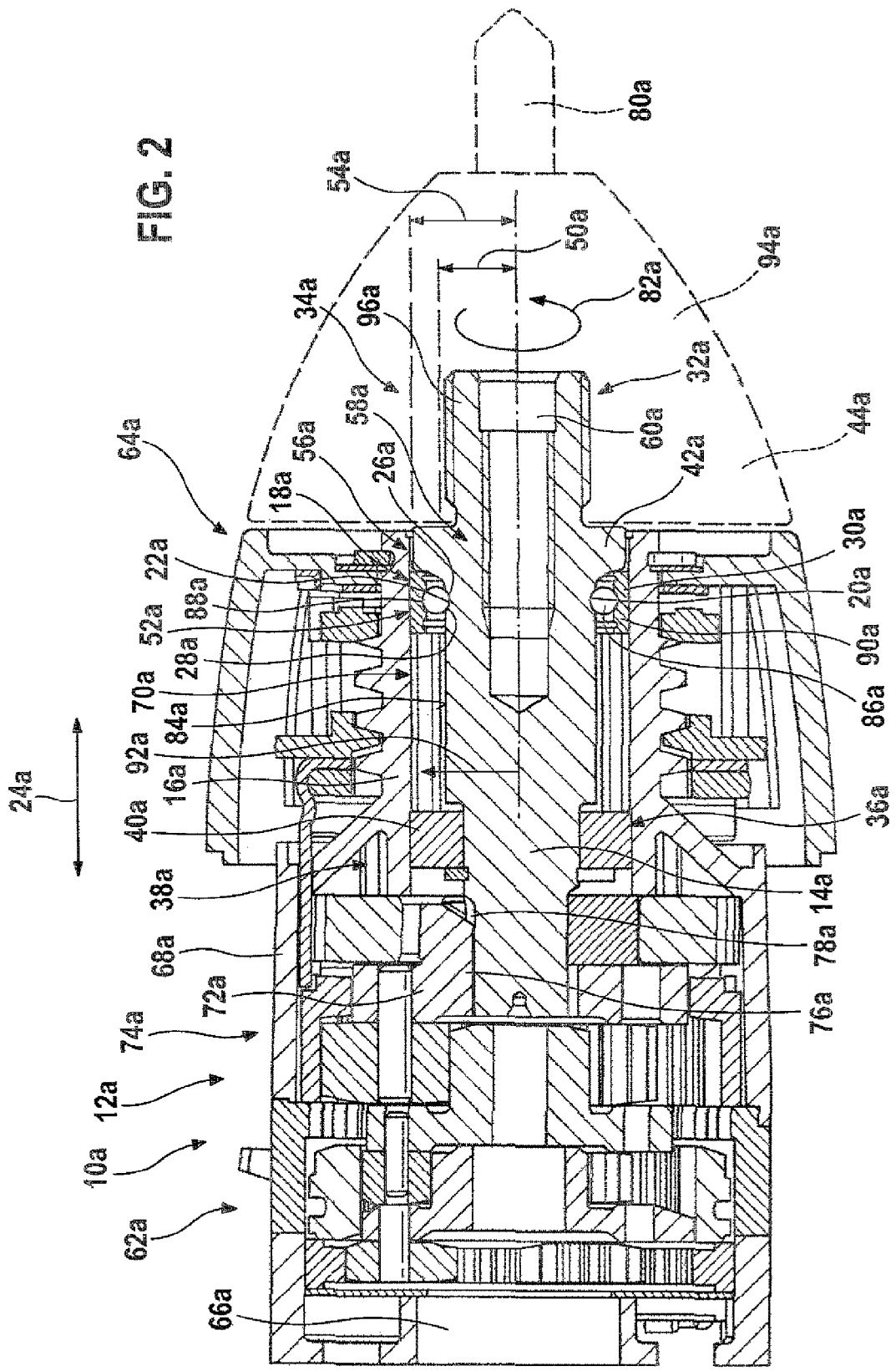
FIG. 2 shows a tool holder region of the hand-held power tool from FIG. 1.

FIG. 1 shows a hand-held power tool 10a according to the invention, embodied in the form of a cordless screwdriver 12a. FIG. 2 shows a tool holder region 64a of the hand-held power tool 10a. In this tool holder region 64a, the hand-held power tool 10a has a steel output shaft 14a that can be driven by an electric motor 66a, a supporting element 16a embodied as integral with a transmission housing 68a, and a roller bearing unit 18a, which comprises a roller bearing 30a and is provided to transmit a supporting force of the output shaft 14a to the supporting element 16a. The roller bearing unit 18a is also a part of a bearing arrangement 70a of the output shaft 14a.

A torque generated by the electric motor 66a is transmitted via a three-stage planetary gear 62a to the output shaft 14a; by means of a gearing 76a, a planet carrier 72a of a third planetary stage 74a of the planetary gear 62a engages with a gearing 78a of the output shaft 14a. The output shaft 14a is embodied in the form of a hollow shaft 60a in a subregion 58a in which the roller bearing unit 18a is situated and which extends from an output end 32a of the output shaft 14a in an axial direction 24a toward the planetary gear 62a. The hollow shaft 60a has an internal thread via which a tool holder 44a, schematically depicted here, in the form of a drill chuck 94*a* can be fastened by means of a screw, not shown here, to the output shaft 14*a*, as a result of which the torque in a screw-driving operation of the hand-held power tool 10*a* is transmitted from the output shaft 14*a* to a schematically depicted tool 80*a* in the form of a screwdriver bit fastened in the drill chuck 94*a*.

The output shaft 14*a* extends in the axial direction 24*a* along the supporting element 16*a* and is supported by the latter against the transmission housing 68*a*. For this purpose, the bearing arrangement 70*a* is equipped with the roller bearing unit 18*a*, which is situated at an end 34*a* closer to the output end 32*a* of the output shaft 14*a* in order to support axial and radial forces of the output shaft 14*a*. The hand-held power tool 10*a* or more precisely stated, the bearing arrangement 70*a*, also has an additional bearing unit 36*a* that is provided to support the output shaft 14*a* and is situated at an end 38*a* remote from the output end 32*a* of the output shaft 14*a* or toward the end closer to the planetary gear 62*a*. The additional bearing unit 36*a* is composed of a slide bearing 40*a* and serves to support radial forces.

Figure 3:
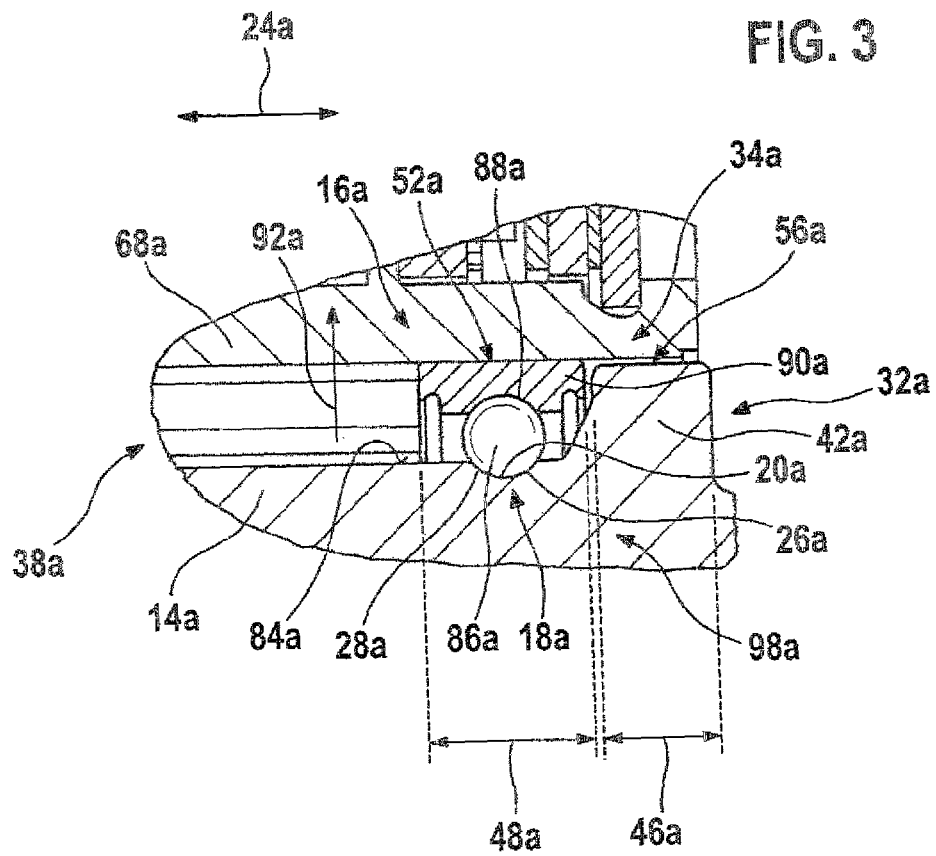
FIG. 3 is a detailed depiction of a bearing region of the tool holder region from FIG. 2.

In addition, the output shaft 14*a* constitutes at least one roller element running surface 20*a* of the roller bearing unit 18*a*, which surface is embodied in the form of an inner roller element running surface 22*a*. The roller element running surface 20*a* is let into the output shaft 14*a* by means of a material-removing method and in particular by means of a turning process and is consequently integral with the output shaft. In addition, the roller element running surface 20*a* extends in a circumference direction 82*a* on an outer surface 84*a* of the output shaft 14*a*. The roller element running surface 20*a* has a first supporting surface 26*a* on the side closer to the output end 32*a* in the axial direction 24*a* of the output shaft 14*a* (FIG. 3). In addition, a second supporting surface 28*a* is situated on the end 38*a* remote from the output end 32*a* in the axial direction 24*a* of the output shaft 14*a*. The supporting surfaces 26*a*, 28*a* are thus situated on two axially opposite sides of the roller element running surface 20*a* and serve to axially fix roller elements 86*a* in the form of balls as they roll along the roller element running surface 20*a*. The roller element running surface 20*a* is embodied in the form of a segment of a circle and is thus adapted to a ball-shaped outer contour 88*a* of the roller elements 86*a*. An outer ring 90*a* of the roller bearing unit 18*a*, which ring is situated between the roller elements 86*a* and the supporting element 16*a* in a radial direction 92*a*, transmits bearing forces of the output shaft 14*a* to the supporting element 16*a* and to the transmission housing 68*a*. To facilitate an assembly of the ball bearing 30*a*, the outer ring 90*a* is embodied in a two-piece fashion and is composed of two half-shells (not shown).

The hand-held power tool 10*a* or more precisely stated, the output shaft 14*a*, has a stop collar 42*a* for the tool holder 44*a*, in this case for the drill chuck 94*a*. In the axial direction 24*a*, the stop collar 42*a* adjoins the roller bearing unit 18*a* at the output end 32*a* or at an end of the tool holder 44*a* and extends in the radial direction 92*a* toward the supporting element 16*a*. It serves as an axial stop for the drill chuck 94*a* when it is screwed onto an end region 96*a* of the output shaft 14*a* situated at the output end 32*a* in an assembly process or more precisely, a screw-mounting procedure.

As shown in the detailed depiction in FIG. 3, which shows a bearing region 98*a* of the hand-held power tool 10*a*, the stop collar 42*a* has an axial width 46*a* that corresponds to 80% of an axial width 48*a* of the roller bearing unit 18*a*. In addition, in a region 52*a* in which the roller element running surface 20*a* is situated, an outer radius 50*a* of the output shaft 14*a* corresponds to 55% of an outer radius 54*a* of the output shaft 14*a* in a region 56*a* in which the stop collar 42*a* is situated (also see FIG. 2).

Figure 4:
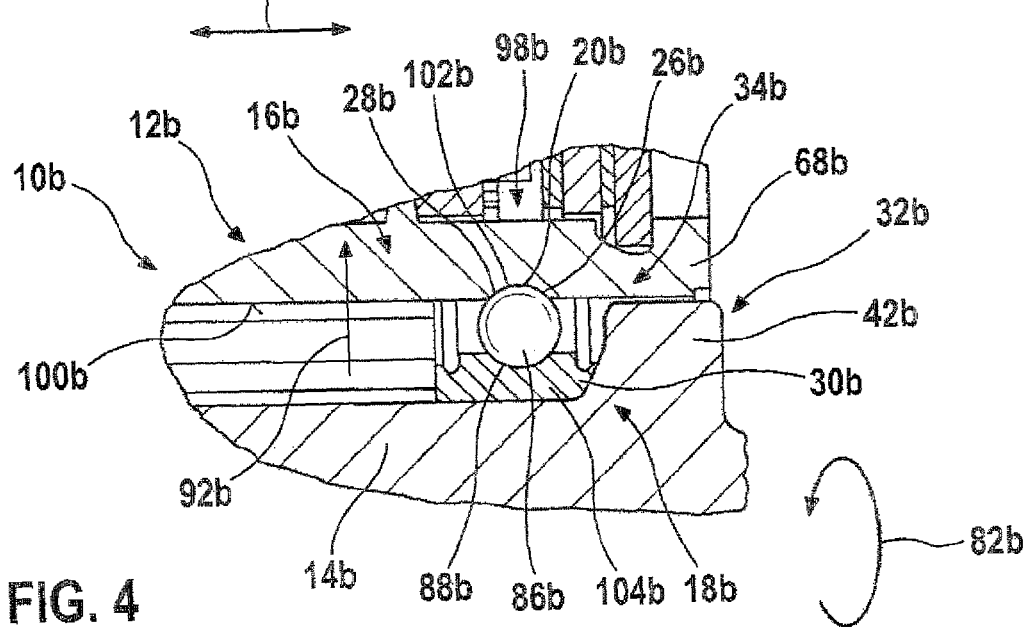
FIG. 4 shows an alternative embodiment of a bearing region in a detailed depiction.
Figure 5:
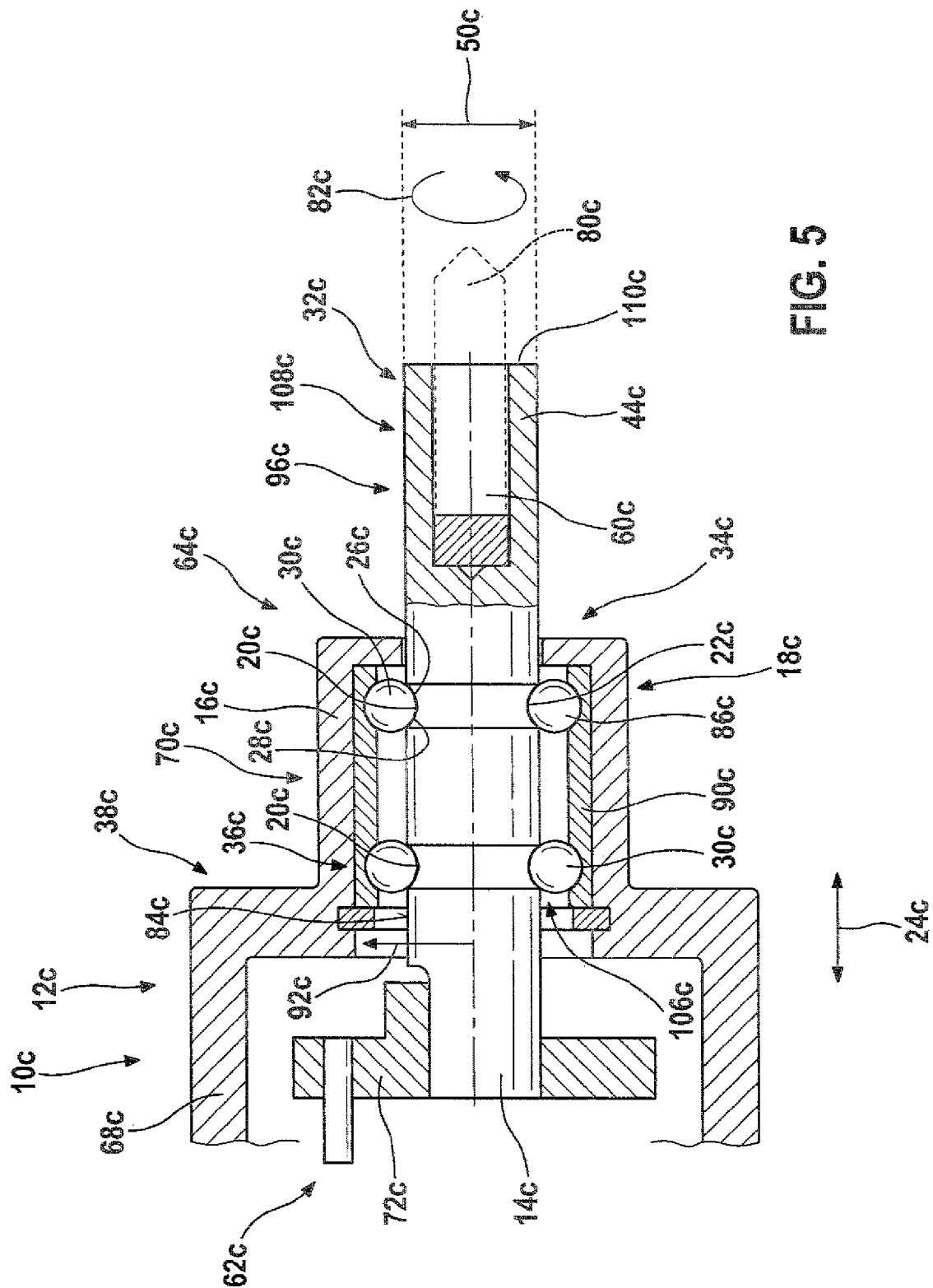
FIG. 5 shows an alternative tool holder region of a hand-held power tool.

FIG. 4 shows an alternative exemplary embodiment of the roller bearing unit 18*a* and FIG. 5 shows an alternative exemplary embodiment of the tool holder region 64*a*. Parts, features, and functions that remain essentially the same have basically been provided with the same reference numerals. In order to differentiate among the exemplary embodiments, though, the letters a through c have been added to the reference numerals of the exemplary embodiments. The description below is essentially limited to the differences from the exemplary embodiment shown in FIGS. 1 through 3; for parts, features, and functions that remain the same, the reader should refer to the description of the exemplary embodiment in FIGS. 1 through 3.

FIG. 4 shows a detail of an alternative hand-held power tool 10*b* in the form of a cordless screwdriver 12*b*, in a detailed depiction of a bearing region 98*b*. The hand-held power tool 10*b* has a drivable output shaft 14*b*, a supporting element 16*b* embodied as integral with a transmission housing 68*b*, and a roller bearing unit 18*b*, which is embodied in the form of a ball bearing 30*b* and is situated at an end 34*b* closer to an output end 32*b* of the output shaft 14*b*. The supporting element 16*b* constitutes a roller element running surface 20*b*, which is embodied in the form of a segment of a circle and is part of the roller bearing unit 18*b*; the roller element running surface 20*b* is constituted by an outer roller element running surface 102*b*, which is let into an inner surface 100*b* of the supporting element 16*b* in the circumference direction 82*b* by means of a turning process. In addition, roller elements 86*b* are guided in the roller element running surface 20*b* and their movement in the axial direction 24*b* is limited by two supporting surfaces 26*b*, 28*b* of the roller element running surface 20*b* that are situated opposite from each other in the axial direction 24*b*. An inner ring 104*b* of the roller bearing unit 18*b*, which ring is situated between the output shaft 14*b* and the roller elements 86*b* in a radial direction 92*b*, transmits bearing forces of the output shaft 14*b* via the roller elements 86*b* to the supporting element 16*b* and to the transmission housing 68*b*. To facilitate an assembly of the ball bearing 30*b*, the transmission housing 68*b* is embodied of two parts or two half-shells (not shown).

Alternatively, however, it would also be possible to embody both an output shaft and a supporting element with an integrally embodied roller element running surface. It would thus be possible to eliminate an inner ring and an outer ring of a roller bearing unit, which would achieve particular savings in terms of space (not shown in detail).

FIG. 5 shows a tool holder region 64*c* of an alternative hand-held power tool 10*c* in the form of a cordless screwdriver 12*c*, having an output shaft 14*c* that can be driven by an electric motor, not shown, via a planet carrier 72*c* of a planetary gear 62*c* and having a supporting element 16*c* embodied as integral with a transmission housing 68*c*. The hand-held power tool 10*c* or more precisely stated, the tool holder region 64*c*, also has a roller bearing unit 18*c* that is situated at an end 34*c* closer to an output end 32*c* of the output shaft 14*c*, is composed of a roller bearing 30*c*, and is provided to transmit a supporting force of the output shaft 14*c* to the supporting element 16*c*. The output shaft 14*c* constitutes a roller element running surface 20*c*, which is embodied in the form of a segment of a circle and is part of the roller bearing unit 18*c*; the roller element running surface 20*c* is constituted by an inner roller element running surface 22*c* that is let into an outer surface 84*c* of the supporting element 16*c* in the circumference direction 82*c* by means of a turning process. In addition, roller elements 86c are guided in the roller element running surface 20c and their movement in the axial direction 24c is limited by two supporting surfaces 26c, 28c of the roller element running surface 20c situated opposite from each other in the axial direction 24c.

The roller bearing unit 18c is also part of a bearing arrangement 70c of the output shaft 14c, which arrangement has an additional bearing unit 36c that is for supporting the output shaft 14c and is situated at an end 38c remote from the output end 32c of the output shaft 14c or toward the end closer to the planetary gear 62c. The additional bearing unit 36c is composed of an additional roller bearing unit 106c in the form of a roller bearing 30c and consequently, is likewise equipped with a roller element running surface 20c or more precisely stated, an inner roller element running surface 22c, which is embodied in the form of a segment of a circle and is for guiding roller elements 86c. The roller bearing units 18c and 106c have a shared outer ring 90c, which is situated between the roller elements 86c and the supporting element 16c in the radial direction 92c and transmits bearing forces of the output shaft 14c to the supporting element 16c; consequently, the roller bearing unit 18c is partially integral with the additional roller bearing unit 106c.

The output shaft 14c is embodied as a hollow shaft 60c in an end region 96c situated at the output end; the end region 96c or more precisely stated, the hollow shaft 60c, represents a tool holder 44c by means of which a tool 80c or more precisely stated, a screwdriver bit, can be fastened. In addition, the output shaft 14c is embodied with a constant outer diameter 50c in a subregion 108c that extends from an end 110c of the output shaft 14c situated at the output end 32c to the roller element running surface 20c of the roller bearing unit 18c.

The foregoing relates to preferred exemplary embodiments of the invention, it being understood that other variants and embodiments thereof are possible within the spirit and scope of the invention, the latter being defined by the appended claims.

The invention claimed is:

1. A hand-held power tool, in particular a cordless screwdriver, comprising:
   a drivable output shaft having an input end attached to a transmission gear and an output end attached to a tool holder of the power tool;
   a supporting element supporting the output shaft which is disposed therein; and
   a roller bearing unit disposed radially between the supporting element and the output shaft, which transmits a supporting force of the output shaft to the supporting element,
   wherein at least one roller element running surface of the roller bearing unit is provided on at least one of the output shaft and the supporting element and extends therearound in a circumferential direction.

2. The hand-held power tool as recited in claim 1, wherein the output shaft constitutes an inner roller element running surface of the roller bearing unit.

3. The hand-held power tool as recited in claim 2, wherein the roller element running surface has at least one supporting surface in an axial direction of the output shaft.

4. The hand-held power tool as recited in claim 3, wherein the roller element running surface has at least one second supporting surface in the axial direction of the output shaft.

5. The hand-held power tool as recited in claim 4, wherein the roller element running surface is embodied in the form of a segment of a circle.

6. The hand-held power tool as recited in claim 1, wherein the roller element running surface has at least one supporting surface in an axial direction of the output shaft.

7. The hand-held power tool as recited in claim 6, wherein the roller element running surface has at least one second supporting surface in the axial direction of the output shaft.

8. The hand-held power tool as recited in claim 1, wherein the roller element running surface is embodied in the form of a segment of a circle.

9. The hand-held power tool as recited in claim 1, wherein the roller bearing unit constitutes a ball bearing.

10. The hand-held power tool as recited in claim 1, wherein the roller bearing unit is situated at an end closer to an output end of the output shaft.

11. The hand-held power tool as recited in claim 1, further comprising at least one additional bearing unit that is provided to support the output shaft.

12. The hand-held power tool as recited in claim 11, wherein the at least one additional bearing unit is situated at an end remote from an output end of the output shaft.

13. The hand-held power tool as recited in claim 12, wherein the at least one additional bearing unit is constituted by a slide bearing or by an additional roller bearing unit.

14. The hand-held power tool as recited in claim 13, wherein the roller bearing unit is integral with the additional roller bearing unit.

15. The hand-held power tool as recited in claim 11, wherein the at least one additional bearing unit is constituted by a slide bearing or by an additional roller bearing unit.

16. The hand-held power tool as recited in claim 15, wherein the roller bearing unit is integral with the additional roller bearing unit.

17. The hand-held power tool as recited in claim 1, wherein the roller element running surface is let into at least one of the output shaft and the supporting element by means of a material-removing method.

18. The hand-held power tool as recited in claim 1, wherein the output shaft is embodied as a hollow shaft at least in a subregion in which the roller bearing unit is situated.

19. The hand-held power tool as recited in claim 1, further comprising a planetary gear.

20. A hand-held power tool, in particular a cordless screwdriver, comprising:
   a drivable output shaft;
   a supporting element;
   a roller bearing unit which transmits a supporting force of the output shaft to the supporting element; and
   at least one roller element running surface of the roller bearing unit provided on at least one of the output shaft and the supporting element,
   wherein the output shaft is embodied with a constant outer diameter in a subregion that extends from an end of the output shaft situated at the output end to the roller element running surface of the roller bearing unit.

* * * * *